United States Patent [19]

Miyamae

[11] 3,928,739

[45] Dec. 23, 1975

[54] NORMALLY OPEN TYPE PUSH BUTTON SWITCH OPERATING MECHANISM

[76] Inventor: Toshiaki Miyamae, 2-16, 2-chome,, Nishi-Iwata, Higashi-Osaka, Osaka-Pref., Japan

[22] Filed: Sept. 9, 1974

[21] Appl. No.: 504,050

[52] U.S. Cl.... 200/155 R; 200/153 LB; 200/153 T; 200/332
[51] Int. Cl.² .................... H01H 3/02; H01H 3/32
[58] Field of Search.. 200/332, 153 T, 335, 153 LB, 200/155 R; 74/519

[56] References Cited
UNITED STATES PATENTS

| | | | |
|---|---|---|---|
| 2,468,673 | 4/1949 | Kaminky | 74/519 |
| 2,571,818 | 10/1951 | Blodgett | 200/332 X |
| 2,939,337 | 6/1960 | Sweger | 74/519 X |
| 3,210,507 | 10/1965 | Kadisevskis et al. | 200/332 X |

Primary Examiner—James R. Scott
Assistant Examiner—William J. Smith
Attorney, Agent, or Firm—Moonray Kojima

[57] ABSTRACT

A mechanism for actuating a normally open type push button switch means composed of a base plate mounted on a switch housing, an actuating plate having one end pivoted on the base plate and disposed in contact with a push button of the switch means, a cam movably supported on the base plate and engageable with the other end of the actuating plate, and a knob movably supported outwardly of the base plate, being fixedly connected to the cam whereby with the movement of the knob the cam is moved to force down the actuating plate, thus pushing down the push button to actuate the switch means.

4 Claims, 6 Drawing Figures

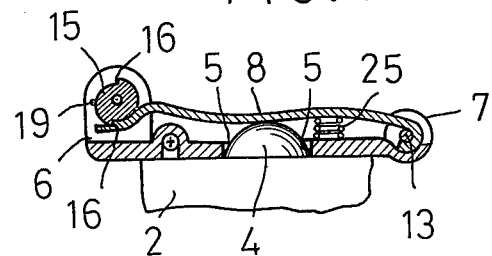
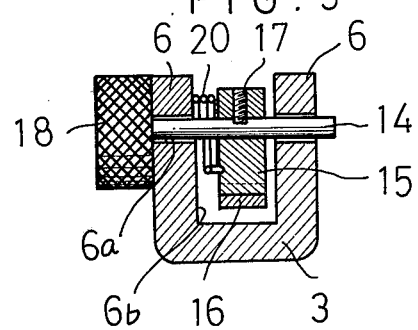
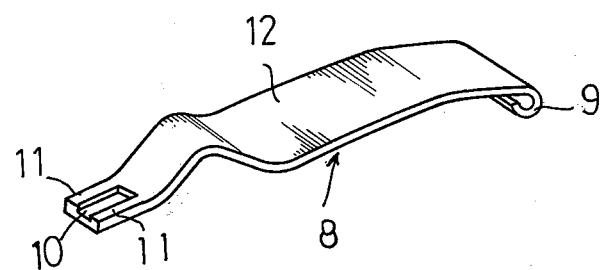

NORMALLY OPEN TYPE PUSH BUTTON SWITCH OPERATING MECHANISM

The present invention relates generally to improvements in a switch operating mechanism, and more particularly to a normally open type push button switch operating means for a motorized fishing reel that can easily and exactly effect switching-on-and-off operations of an electric motor for driving a spool of the reel.

Most of the conventional push button switch mechanism for motorized fishing reels are such that they are mounted rearwardly of the reels so as to selectively effect the switching-on-and-off operations by pushing with a finger tip a push button resiliently mounted on a switch housing.

According to these switch mechanisms, however, it is necessary for fishermen to keep on pushing the push button with a finger tip for a certain length of time so as to rotate a spool of the reel, especially when they are fishing up a catch on retrieving a fishing line onto the spool.

In the above-mentioned case, fishermen must hold a fishing rod provided with a considerably heavy weight reel while operating the switch means with a finger tip of the other hand; consequently fishermen are easily made fatigued with the hand holding the rod.

Accordingly, the present invention has been designed to eliminate the above-mentioned drawbacks and disadvantages, having as one of its main objects the provision of such a normally open type push button switch operating mechanism for use with a motorized fishing reel that fishermen are able to operate switching-on-and-off operations continuously or discontinuously, as desired.

It is another object of the invention to provide a switch operating mechanism that fishermen are easily able to operate a push button switch means to rotate a spool of a fishing rod or stop the rotation thereof while enjoying fish game.

It is a further object of the invention to provide a structurally much simplified switch operating mechanism that comprises a base plate on the upper portion of a switch housing, a switch actuating plate rotatably pivoted on said base plate, a cam mounted on one end of said actuating plate so as to move the actuating plate downwardly by rotating said cam thereby causing a pawl of the cam to engage with a notched portion of the actuating plate.

The invention is further illustrated with reference to the accompanying drawings, in which:

FIG. 4 is likewise a side elevation view showing how the mechanism is when the actuating plate is engaged with the cam to push down the push button of a switch means;

FIG. 5 is an enlarged perspective view of the actuating plate; and

FIG. 6 is a vertically cross sectioned elevation view taken on the line A — A of FIG. 2.

Figure 1:
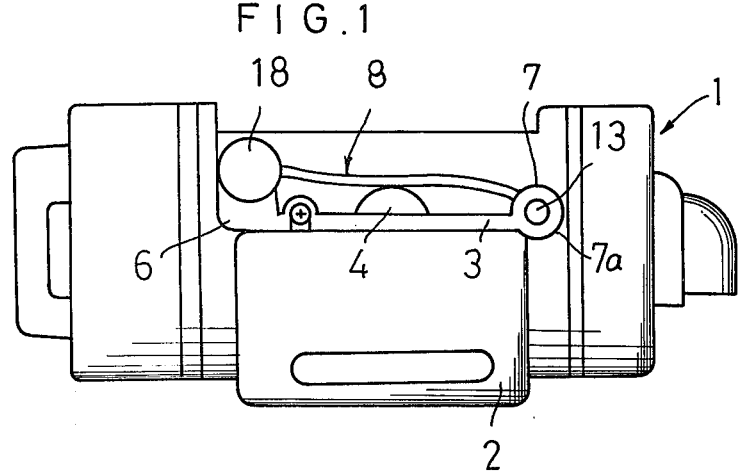
FIG. 1 is a front elevation view of the switch operating mechanism embodied in accordance with the invention.

Referring now to the push button switch operating mechanism of the present invention, and firstly to FIG. 1 of the accompanying drawings, reference numeral 1 generally designates a motorized fishing reel, rearwardly of which is fixedly mounted a switch housing 2.

The aforesaid construction of the mechanism is well known in art and particular description thereof will be omitted.

Figure 2:
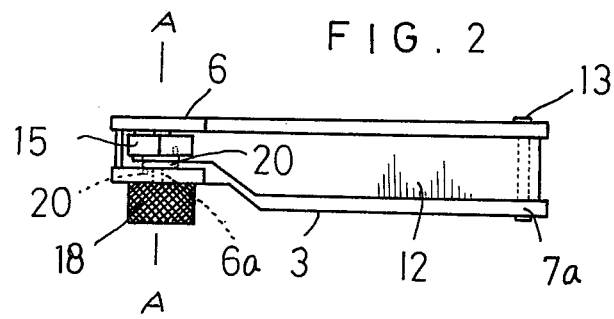
FIG. 2 is a top plan view thereof.
Figure 3:
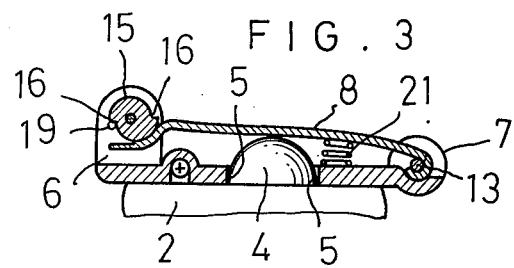
FIG. 3 is a side elevation view showing how the mechanism is when not in operation, or when an actuating plate is disengaged from a cam.

In the present invention, said switch housing 2 is adapted to support a base plate 3. As is shown in FIGS. 2 and 3, said base plate 3 has a middle portion bored with a through hole or opening 5 for receiving a push button 4 of a normally open switch means (not shown) protruding from the upper surface area of the switch housing 2. Both ends of the base plate 3 are upwardly bent to form substantially U shape cross sectioned portions 6 and 7, the latter (the right hand side with respect to the drawings) being adapted to support an actuating plate 8.

Said portions 6 and 7 are bored with small holes 6a and 7a, respectively, for the purpose to be described hereinafter. The actuating plate 8 has one end (the right hand side with respect to the drawings) bent to form a ring 9, the other end 11 being flattened and provided with a notched portion 10 formed in the middle thereof, and a flat surface middle portion 12 having an underneath area normally held in contact with a head of the push button 4 whereby the actuating plate 8 is movably pivoted on the base plate 3 by means of a pin 13 inserted into said ring 9 through said small hole 7a of the U shape cross sectioned portion 7.

In the hole 6a of the U shape cross sectioned portion 6 there is inserted a shaft 14 for supporting a round shape cam 15 formed on the outer periphery thereof with a pawl 16 operably engageable with said notched portion 10 of the flattened end 11. The cam 15 is rigidly fixed to the shaft 14 by means of a set screw 17 and a knob or finger screw 18 is fixedly connected to the shaft 14 outwardly of the base plate 3 so that the cam 15 is movable together with the knob 18, the result being that the pawl 16 is brought into contact with the notched portion 10.

In order to prevent the cam 15 from moving to excess, a stopper 19 is formed in a proper position of inner side wall 6b of the U shape cross sectioned 6. A coil spring 20 is fixedly connected in one end to the cam 15 and in the other end to the inner side wall 6b of the U shape cross sectioned portion 6 as shown in FIG. 6 so that the cam 15 is normally provided with a potential to be moved in clockwise direction with respect to the drawings by the resiliency of the coil spring 20.

Between the base plate 3 and the actuating plate 8 there is held a coil spring 21 so that the plate 8 is turnable to its original position by the dynamical stability of the coil spring 21.

When the mechanism of the invention is to be used, especially to rotate a spool of the reel 1 continuously for a certain length of time, the knob 18 is moved in the counterclockwise direction. By this movement the cam 15 is also moved with the knob 18 in the same direction whereby the pawl 16 of the cam 15 is frictionally slid on the actuating plate 8 to move down the same until the pawl 16 is engaged with the notched portion 10 of the plate 8. When the pawl 16 is engaged with the notched portion 10, the underneath flat surface portion of the actuating plate 8 is forced to press the push button 4 thereby to switch on an electric motor of the reel 1. Accordingly, as long as the cam remains engaged with the notched portion 10, the mechanism continues to switch on the motor thereby to rotate the spool of the reel 1.

In order to switch off the motor and stop the rotation of the spool, the actuating plate 8 is pushed down with a finger tip thereby releasing the engaged relation of the pawl with the notched portion 11. By so doing the cam 15 is moved in the counterclockwise direction to return to its original position by the dynamical stability of the coil spring 20; consequently the actuating plate 8 is also returned to its original position by the dynamical stability of the coil spring 21. This has the result that the push button 4 is finally released from the pressing force of the actuating plate 8 to be switched off.

Thus if it is necessary to switch on and off discontinuously, the actuating plate 8 is merely pushed down with a finger tip, instead of moving the knob. However, it is a matter of course that the discontinuous switching-on-and-off operations can also be effected by moving said knob 18.

Though one specific embodiment of the present invention has been shown and described herein, it will be apparent to those skilled in the art that the invention is not restricted to the details set forth but many changes and modifications may be made without departing from the spirit and scope of the invention as defined in the annexed claims.

What is claimed is:

1. A normally open type push button switch operating mechanism comprising a switch housing, a base plate fixedly mounted on the upper portion of said housing, an actuating plate having one end pivotally supported on said base plate, a contact element protruding from said base plate in a position contactable with the underneath portion of said actuating plate, a cam movably supported on one end of said base plate, the other end of said actuating plate formed to frictionally contact said cam, a knob fixedly connected to said cam outwardly of said base plate, a resilient means held between said base plate and said actuating plate to normally hold said actuating plate in contact with said contact element.

2. The normally open type push button switch operating mechanism according to claim 1, wherein said base plate comprises
   a. portions to be fixedly connected to the upper portion of said switch housing,
   b. both ends bent upwardly to form a substantially U shape in vertical cross section, respectively,
   c. a through hole perforated on each of said ends, and
   d. an opening formed near the middle of said base plate to therein receive said contact element protruding from said housing.

3. The normally open type push button switch operating mechanism according to claim 1, wherein said actuating plate comprises
   a. one end bent into a circular shape and formed with a through hole in the center thereof,
   b. the other end having a flattened surface area and a notched portion formed in the middle of said area,
   c. an intermediate portion having a flattened surface area and an underneath surface area thereof contactable with said contact element, and
   d. a portion adjacent to said intermediate portion upwardly inclined in a position of being easily pushed down with a finger tip.

4. The normally open type push button switch operating mechanism according to claim 1, further comprising
   a. said cam supported on a shaft axially extending from said knob in the end opposite to said one end of said base plate pivotally supporting said actuating plate,
   b. pawl members formed on the outer periphery of said cam so as to be engageable with said notched portion,
   c. a stopper formed in a proper position of an inner side wall of said vertically U shape cross sectioned portion, being adapted to prevent the cam from moving to excess, and
   d. a resilient means held between said cam and said inner side wall thereby permitting said cam to move in one direction.

* * * * *